Dec. 29, 1953  C. D. MATTINGLY  2,663,923
STRAP SEAL
Filed May 13, 1952
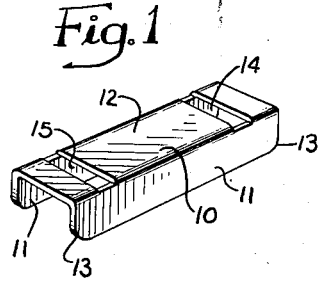
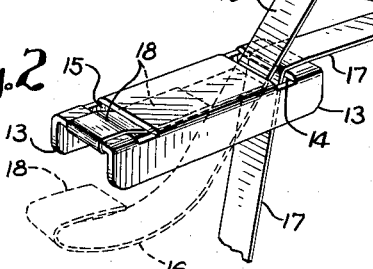
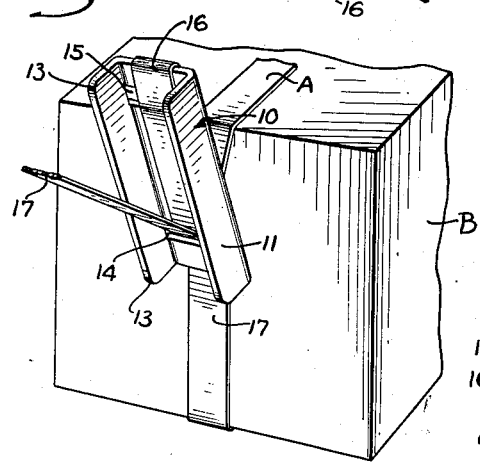
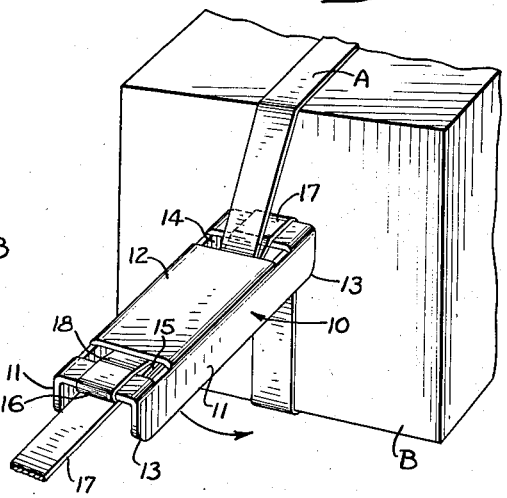
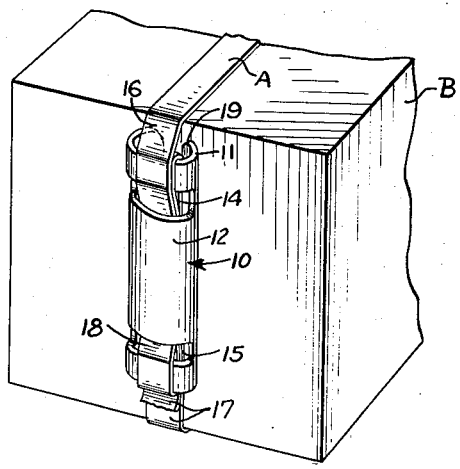
INVENTOR.
Charles D. Mattingly
BY Dawson & Sons
Attys.

Patented Dec. 29, 1953

2,663,923

UNITED STATES PATENT OFFICE 2,663,923

STRAP SEAL

Charles D. Mattingly, Wichita, Kans.

Application May 13, 1952, Serial No. 287,655

3 Claims. (Cl. 24—273)

This invention relates to a strap seal, and more particularly to a seal device which may be employed with metal, fiber or other flexible strap for securing the same tightly about an object.

An object of the present invention is to provide a seal for use with flat metal strap and which eliminates the need of special tools for stretching and sealing steel strap. Another object of the invention is to provide a metal plate seal device which is of very small size and which is highly effective in the quick sealing of metal strap after the same has been drawn about an object. Yet another object of the invention is to provide a means and method for securing steel strap and the like about objects while utilizing the plate seal as a means for drawing the strap tight and securing it in taut condition. Other specific objects and advantages will appear as the specification proceeds.

The invention is shown in an illustrative embodiment by the accompanying drawing, in which—

Fig. 1 is a perspective view of a plate seal which may be employed with metal strap in accordance with my invention; Fig. 2, a perspective view showing the metal strap engaged by the seal plate in a preliminary stage of the sealing operation; Fig. 3, a view similar to that in Fig. 2 but showing a second stage in the sealing operation; Fig. 4, a view similar to that in Figs. 1 and 2 but showing the seal plate in the act of pulling the strap tight; and Fig. 5, a view similar to that in Figs. 2, 3, and 4 but showing the final stage in the sealing operation in which the flanges of the seal plate are turned inwardly.

In the illustration given, 10 designates a seal plate having inwardly-turned side flanges 11 and a relatively horizontal or flat body portion 12. The flanges 11 may be provided with rounded corners 13. The flat body portion 12 of the plate is provided at its rear with a rear transverse slot 14 and at its forward end with a front transverse slot 15. In the illustration given, the slots 14 and 15 are spaced inwardly from their respective ends for an equal distance, making it possible for the seal plate to be used with the ends reversed if desired. However, if it is desired that greater leverage be provided at one end than at another in the tightening operation which will be later described, one of the slots may be spaced more nearly toward the center than the other.

The seal plate 10 may be of any desired size, thickness, and may be formed of any suitable metal. The seal plate preferably has malleable flanges 11 which may be employed for a locking operation which will be later described. In the illustration given, the seal plate 10 has a length of approximately one inch and the remainder of the structure is in proportion. It will be understood that the dimensions may vary depending upon the type of metal strap employed and the strength required for the seal.

In the operations described in Figs. 2, 3, 4, and 5, the free end portion 16 of the tape A is drawn through the rear slot 14 while the opposite portion of the strap is drawn about a small package or object B. After being drawn about the object, the other end portion 17 of the strap is passed through the same rear slot 14, as illustrated in Fig. 2. The end portion 16 of the strap is bent upon itself and a portion 18 thereof bent back upon itself and extended through the front slot 15, as shown more clearly in Fig. 2. The bending of the strap portion 16 before being inserted through the front slot 15 is illustrated in Fig. 2 by dotted lines and the strap end in place is indicated in solid lines.

The free end portion 17 of the strap A is then drawn tight by the hand, as illustrated in Fig. 3, and while the free end portion 17 of the strap is held tight with the fingers, the plate seal 10 is bent downwardly, as illustrated in Fig. 4. The lever action of the seal plate tightens the strap around the object 13, as illustrated in Fig. 4. The turning of the seal plate 10 is continued until the flanges 11 thereof extend about and straddle the portion of the strap end 17 on the inner side of the seal plate 10 and the flanges 11 are then bent in and around this portion of the strap by the use of pliers.

By pressing the pliers inwardly against the side flanges 11, the bottom portion 19 of the flanges are turned under the strap and serve to secure the plate seal in the final locking position illustrated in Fig. 5.

It will be observed that the free end portion 18 of the strap end 16 is securely held in position because this lies below the portion 16 of the strap leading to the package B and the tighter the strap portion 16 is drawn, the more securely the end portion 18 is held in position. The other end portion 17 of the strap is securely locked by being also doubled back upon itself and, in the final position illustrated in Fig. 5, the end portion 16 of strap A overlies the portion of the strap end 17 entering the rear slot 14 and the more tautly strap 16 is drawn the tighter is held this portion of the strap end 17. Since this pressure is about the portion of strap 17 where it forms a bend and is bent back upon itself, a sturdy lock is obtained.

The rounded corners 13 of the plate seal permit an effective locking action during the clamping step in which an end portion of the plate serves as a lever to draw the strap tight. As already stated, the slots 14 and 15 may be spaced at different distances from the ends to give the desired leverage for different types of straps which may be utilized and the thickness of the metal and dimensions of the plate seal may be varied widely according to the uses to which it is to be put.

The structure may be varied considerably depending upon the type of strap being used. For example, if desired, the end portions of the flat body or bed 12 may be depressed so that the strap ends may be fed more readily through the slots 14 and 15. I prefer, however, the structure shown in which the end portions of the bed 12 are in the same plane as the remainder of the body since this gives a more effective clamping action.

The actual sealing operation requires an extremely brief period of time and no tools are required except pliers for the final clinching operation. The leverage required for the tightening of the strap about the object is furnished entirely by the seal plate itself and an effective lock is produced by bending the seal plate to the final position shown in Fig. 5.

While in the foregoing specification, I have set forth a specific structure in considerable detail for the purpose of illustrating an embodiment of my invention, it will be understood that such details of structure may be varied widely by those skilled in the art without departing from the spirit of my invention.

I claim:

1. A strap seal for securing an object, comprising a plate having forwardly-turned side flanges extending continuously from the front to the rear of the plate, said plate having a rear transverse slot near the rear end thereof and spaced from said end and having a front transverse slot at the front end thereof, and a flexible strap having one end portion extending through said rear slot of the plate and about the front thereof and through said front slot, said strap having its other portion extending about the rear end of the plate and through the rear slot thereof, said plate having its flanges clinched about said last-mentioned end portion of the strap.

2. In combination with a metal strap, a plate having forwardly-turned side flanges to provide a U-shaped structure in cross-section, said flanges extending continuously from the front to the rear of said plate, said plate having a rear transverse slot spaced from the rear end thereof and having a front transverse slot spaced from the front end thereof, said strap having one end portion extending through the rear slot and about the front end of the plate and then backwardly through the front slot of the plate and having its other end portion extending about the rear end of the plate and through the rear slot thereof and then bent backwardly upon itself, the forwardly-extending flanges of said plate enclosing said last-mentioned strap end portions and having their inner edge portions turned under said strap end portions.

3. The structure of claim 2 in which the corners of said flanges are rounded.

CHARLES D. MATTINGLY.

References Cited in the file of this patent

UNITED STATES PATENTS

| Number | Name | Date |
|---|---|---|
| 713,203 | Campbell | Nov. 11, 1902 |
| 2,062,099 | MacChesney | Nov. 24, 1936 |

FOREIGN PATENTS

| Number | Country | Date |
|---|---|---|
| 441,906 | Germany | Mar. 16, 1927 |